United States Patent
Edwards et al.

(10) Patent No.: US 12,374,956 B2
(45) Date of Patent: Jul. 29, 2025

(54) CONTROL SURFACE ACTUATOR WITH BELL CRANK ASSEMBLY

(71) Applicant: Parker-Hannifin Corporation, Cleveland, OH (US)

(72) Inventors: David E. Edwards, Rancho Santa Margarita, CA (US); Abbas M. Charafeddine, Mission Viejo, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 342 days.

(21) Appl. No.: 18/168,240

(22) Filed: Feb. 13, 2023

(65) Prior Publication Data
US 2023/0291275 A1 Sep. 14, 2023

Related U.S. Application Data

(60) Provisional application No. 63/395,800, filed on Aug. 6, 2022, provisional application No. 63/318,980, filed on Mar. 11, 2022.

(51) Int. Cl.
*H02K 7/075* (2006.01)
*F16H 21/18* (2006.01)

(52) U.S. Cl.
CPC .............. *H02K 7/075* (2013.01); *F16H 21/18* (2013.01)

(58) Field of Classification Search
CPC .. H02K 7/075; F16H 21/18; F16H 2025/2075
See application file for complete search history.

(56) References Cited

U.S. PATENT DOCUMENTS

| 5,313,852 A * | 5/1994 | Arena ................. F16H 25/2018 |
| | | 74/89.35 |
| 9,376,203 B2 | 6/2016 | Tieys et al. |

(Continued)

FOREIGN PATENT DOCUMENTS

| RU | 2622321 C1 | 6/2017 |
| WO | 2007024220 A1 | 3/2007 |
| WO | 2021069994 A1 | 4/2021 |

OTHER PUBLICATIONS

Stephen C. Jensen et al., "Flight test experience with an electro-mechanical actuator on the F-18 systems research aircraft," Oct. 7, 2000, NASA, pp. 1-10, URL: https://www.nasa.gov/centers/dryden/pdf/88699main_H-2425.pdf.

(Continued)

*Primary Examiner* — Tulsidas C Patel
*Assistant Examiner* — Mohammed Ahmed Qureshi
(74) *Attorney, Agent, or Firm* — Renner, Otto, Boisselle & Sklar, LLP

(57) ABSTRACT

A linear electro-mechanical actuator assembly includes a linear actuator having an output rod end, and a bell crank assembly having a bell crank that is rotatable around a central axis and that has a rod connection opening for receiving the rod end. The bell crank further includes a tube opening along the central axis for receiving a torque tube. First and second bearing plates are positioned on opposite sides of the bell crank, whereby the bank crank rotates relative to the first and second bearing plates. A connection pin provides a hinge connection of the rod end to the bell crank such that linear motion of the rod end imparts rotational motion to the bell crank. The bell crank includes bearing supports positioned on opposite sides of the bell crank body. Circular bearings are positioned within the (Continued)

bearing plates, and around the bearing supports, to support the rotational motion of the bell crank.

20 Claims, 8 Drawing Sheets

(56) References Cited

U.S. PATENT DOCUMENTS

| | | |
|---|---|---|
| 11,235,862 B2 | 2/2022 | Miyazono et al. |
| 11,239,728 B2 | 2/2022 | Borgarelli et al. |
| 2005/0168084 A1 | 8/2005 | Tesar |
| 2014/0326828 A1* | 11/2014 | Senegas .................. F16H 35/00 244/99.3 |
| 2016/0258385 A1* | 9/2016 | Lumbab ................... F02K 1/15 |
| 2019/0048961 A1 | 2/2019 | Fox et al. |
| 2020/0103009 A1 | 4/2020 | Borgarelli et al. |
| 2020/0300343 A1 | 9/2020 | Bekircan |
| 2022/0227484 A1 | 7/2022 | Brewer et al. |

OTHER PUBLICATIONS

Ryan Klemetson, "What's best? Integrated linear actuators or traditional," Tolomatic, Jan. 15, 2020, URL: https://www.tolomatic.com/blog/whats-best-integrated-linear-actuators-or-traditional/.

* cited by examiner

CONTROL SURFACE ACTUATOR WITH BELL CRANK ASSEMBLY

This application claims priority of U.S. Application No. 63/395,800, filed Aug. 6, 2022 and U.S. Application No. 63/318,980, filed Mar. 11, 2022, each of which is hereby incorporated herein by reference in its entirety.

FIELD OF INVENTION

The present application relates to linear electro-mechanical actuators, and more particularly to a linear electro-mechanical control actuator assembly that employs a bell crank assembly to convert linear motion to rotational or articulating motion for operating a control surface. Embodiments of the present application, for example, may be used to articulate a control surface for control of an aircraft.

BACKGROUND OF THE INVENTION

A linear electro-mechanical actuator (EMA) is typically used to articulate the flight control surfaces and other components on an aircraft. A typical linear EMA may include an electric motor that drives motion of the actuator, and the electric control motion further may be implemented with an electric brake. The motor output is mechanically coupled to a speed reduction gear train, through which the electric motor drives a power screw assembly, such as for example a ball screw and ball nut assembly with mechanical stops. The power screw assembly converts the rotational motion of the motor output into a linear motion. The power screw assembly is mechanically coupled to an actuating element having a rod end, whereby operation of the power screw assembly drives motion of the rod end in a linear direction.

An example usage of a linear EMA is to rotate or articulate a control surface. In conventional configurations of such usage, the rod end of the linear EMA is connected to a linkage that is rotated or articulated by the linear EMA, which in turn operates to rotate or articulate the control surface. The linkage may be a control lever, or a linkage assembly of multiple control levers. "Dog bone" linkage configurations also are known in the art to convert an output of the linear EMA to articulate a control surface. As one example usage (and constituting a non-limiting example), a linear EMA is fixed to an aircraft structure via a suitable linkage to employ the actuator's linear motion to articulate the control surface to a commanded angle position. Some typical control surfaces requiring angular position control for aircraft control include, for example, a rudder control surface, elevon control surface, elevator control surface, flap control surface, aileron control surface, ground spoiler control surface, flight spoiler control surface, spoileron control surface, flaperon control surface, and door control surface.

In many applications, and in aircraft applications in particular, component size and weight are significant considerations and should be minimized. In a typical fuel powered aircraft, for example, the wing spars and fuselage tend to function as fuel tanks. Accordingly, the various actuators and related linkage components tend to be housed in specialized or dedicated component boxes, housings, or comparable compartments mounted externally of the wing spars. It is challenging, therefore, to further reduce size and weight of the actuator systems, including the linkages associated with connecting the linear actuators to the control surfaces.

In many industries, environmental concerns are spurring development of electric powered machinery and vehicles as alternatives to carbon-based fuel powered machinery and vehicles. Such concerns are present in the aircraft industry and have led to attempts to develop electric powered aircraft. Such electric aircraft include electric vertical take-off and landing (eVTOL) aircraft. Electric aircraft, and eVTOL aircraft in particular, tend to be substantially smaller and lighter than conventional fuel powered aircraft. More broadly, the developing VTOL industry also includes hybrid aircraft that are a combination of electric flight controls and a conventional fuel driven turbo prop. This class of smaller vehicles could benefit from electromechanical actuation systems of reduced size, but current electromechanical actuation technology is not competitive with traditional hydraulic actuation used on large aircraft.

Accordingly, actuator assembly size and weight are significant concerns in small aircraft applications including for eVTOL and other smaller VTOL aircraft. That said, electric aircraft present an opportunity for size minimization because there is no need to utilize the wing spars as fuel tanks as is conventional. It would be desirable, therefore, to mount or house actuator assemblies, and in particular linear EMAs for articulating control surfaces, within the wing spars. However, the wing spars of eVTOL and other electric or VTOL aircraft are relatively small in size and therefore unsuitable to house conventional EMAs. The linkage structures, such as lever, rotary actuator, or dog bone structures, associated with connecting a conventional EMA output to a given control surface render the EMA too large to be housed within the wing spar of a typical eVTOL or other electric or VTOL aircraft. Accordingly, having to mount current actuator assemblies in a conventional manner as done in fuel powered aircraft, with fairings causing substantial drag losses, reduces the efficiency and performance in such aircraft applications.

SUMMARY OF THE INVENTION

There is a need in the art, therefore, for an improved linear electro-mechanical actuator (EMA) assembly that has a minimal size and compact configuration for enhanced control to articulate a control surface. For example, embodiments of the linear EMA assembly of the present application may be employed to articulate the flight control surfaces and other components on an aircraft, and in particular are suitable for use in an electric vertical take-off and landing (eVTOL) or other electric or VTOL aircraft.

The linear EMA assembly may be sufficiently compact for incorporation within the wing spar of a typical eVTOL or other electric or VTOL aircraft. The linear EMA assembly offers a high-speed control solution by employing a specially designed bell crank having a short horn arm, which allows for a substantially more compact configuration as compared to conventional linear EMA configurations. The linear EMA assembly further offers an efficiency characterized by high load/torque performance with low power consumption, which further renders the linear EMA assembly highly suitable for eVTOL aircraft in which power consumption is a substantial consideration. When compared to conventional configurations that employ a rotary actuator, dog bone, linkage levers, or other linkage concept, the linear EMA assembly of the present application consumes about half the power as compared to a conventional rotary EMA for the same loaded rate. The linear EMA assembly employs a compact bell crank assembly that can be mounted directly to the main spar of the aircraft structure. The bell crank assembly supports thrust loads through two large diameter angular contact bearings. This allows two or more of the linear EMA assemblies to be positioned on an aircraft control surface to act directly as a hinge line drive without any additional linkage structures. Accordingly, the linear EMA assembly of the current application replaces the conventional actuator assembly that uses dog bone or comparable lever links that drive control surfaces using separate hinges, with the linear EMA assembly of the current application being operated using one compact hinge and drive assembly directly at the hinge line.

In exemplary embodiments, the linear EMA assembly includes a bell crank assembly that is connected to the actuator output rod end. The bell crank assembly includes a bell crank that is rotatable around a central axis. The bell crank includes a bell crank body and a pair of circular bearing supports separated along the central axis and defining a rod connection opening between the bearing supports. Each of the bearing supports includes a tube opening along the central axis, and the bell crank body includes a pin opening sized to receive a connection pin for pivotally connecting the actuator rod end to the bell crank within the rod connection opening. Each tube opening of the bearing supports includes a spline interface that fixedly cooperates with a spline interface of a torque tube. The bell crank assembly further includes a pair of bearing plates and associated pair of circular contact bearings, with each contact bearing being received within a respective bearing plate. Each bearing plate defines an internal bearing cavity, with each contact bearing being supported within a respective internal bearing cavity. Each bearing plate further includes an opening for connecting the bearing plate to a support structure, such as for example a wing spar for use in an aircraft application. The bearing plates and contact bearings are located on opposite sides of the bell crank in supportive, rotational contact with a respective bearing support of the bell crank.

An aspect of the invention, therefore, is a linear electro-mechanical actuator (EMA) assembly including a linear actuator that imparts rotational or articulating motion to a bell crank in a compact configuration. In exemplary embodiments, the linear EMA assembly includes a linear actuator having an electric motor, a transmission assembly, and an actuating element having a rod end, wherein the transmission assembly converts an output of the electric motor into a linear motion of the actuating element. The linear EMA assembly further includes a bell crank assembly having a bell crank that is rotatable around a central axis and that has a rod connection opening for receiving the rod end, the bell crank further including a tube opening along the central axis for receiving a torque tube. The bell crank assembly further includes a first bearing plate and a second bearing plate positioned on opposite sides of the bell crank, whereby the bell crank rotates relative to first bearing plate and the second bearing plate; and a connection pin to provide a hinge connection of the rod end to the bell crank such that the linear motion of the rod end imparts a rotational or articulating motion to the bell crank.

In exemplary embodiments of the linear EMA assembly, the first bearing plate has a first internal bearing cavity and the second bearing plate has a second internal bearing cavity, and the bell crank assembly further includes a first bearing that is positioned within the first internal bearing cavity and a second bearing this positioned within the second internal bearing cavity, and the first bearing and the second bearing rotationally support the rotating or articulating motion of the bell crank. The bell crank assembly further may include a bell crank body that defines the rod connection opening, and a first bearing support and a second bearing support positioned on opposite sides of the bell crank body. The first bearing support is positioned within the first bearing and the second bearing support is positioned within the second bearing for supporting the rotating or articulating motion of the bell crank.

Another aspect of the invention is a hinge line drive that includes the linear EMA assembly accordingly to any of the embodiments. The hinge drive further includes at least one torque tube that is fixed to the bell crank at the tube opening, wherein the rotating or articulating motion of the bell crank rotates the torque tube; and a control structure that is fixed to the torque tube at a location spaced apart from the bell crank, wherein rotation of the torque tube rotates or articulates the control structure. The control structure may be connected to a control surface, such as for example a control surface for aircraft control, and rotation or articulation of the control structure sets an angular position of the control surface.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DESCRIPTION

Figure 1:
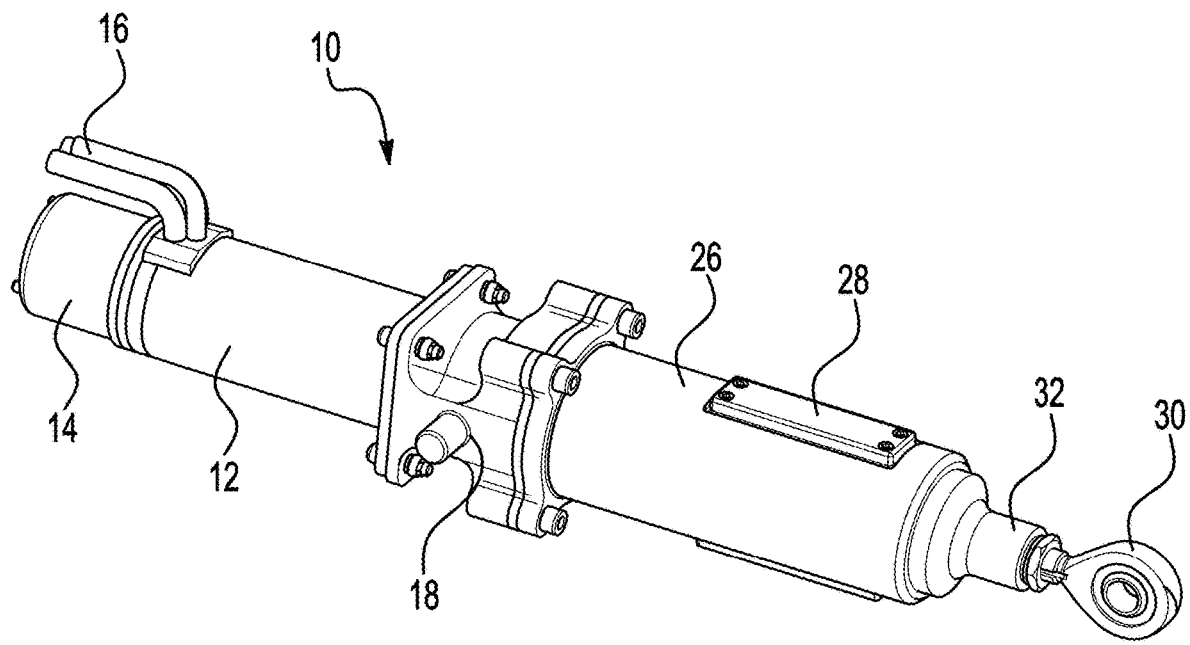
FIG. 1 is a drawing depicting an isometric view of an exemplary linear electro-mechanical actuator (EMA) for use in an actuator assembly in accordance with embodiments of the present application.

Embodiments of the present application will now be described with reference to the drawings, wherein like reference numerals are used to refer to like elements throughout. It will be understood that the figures are not necessarily to scale.

The present application describes an improved linear electro-mechanical actuator (EMA) assembly that has a minimal size and compact configuration for enhanced control to rotate or articulate a control surface to set an angular position of the control surface. For example, embodiments of the linear EMA assembly of the present application may be employed to articulate the flight control surfaces and other components on an aircraft, and in particular are suitable for usage in an electric vertical take-off and landing (eVTOL) or other electric or VTOL aircraft. Although embodiments of the present application are described principally in connection with aircraft applications, and electric aircraft applications in particular, it will be appreciated that comparable principles may be applied for use in any application in which a compact linear EMA assembly is suitable for articulation or rotation of a control surface.

Figure 2:
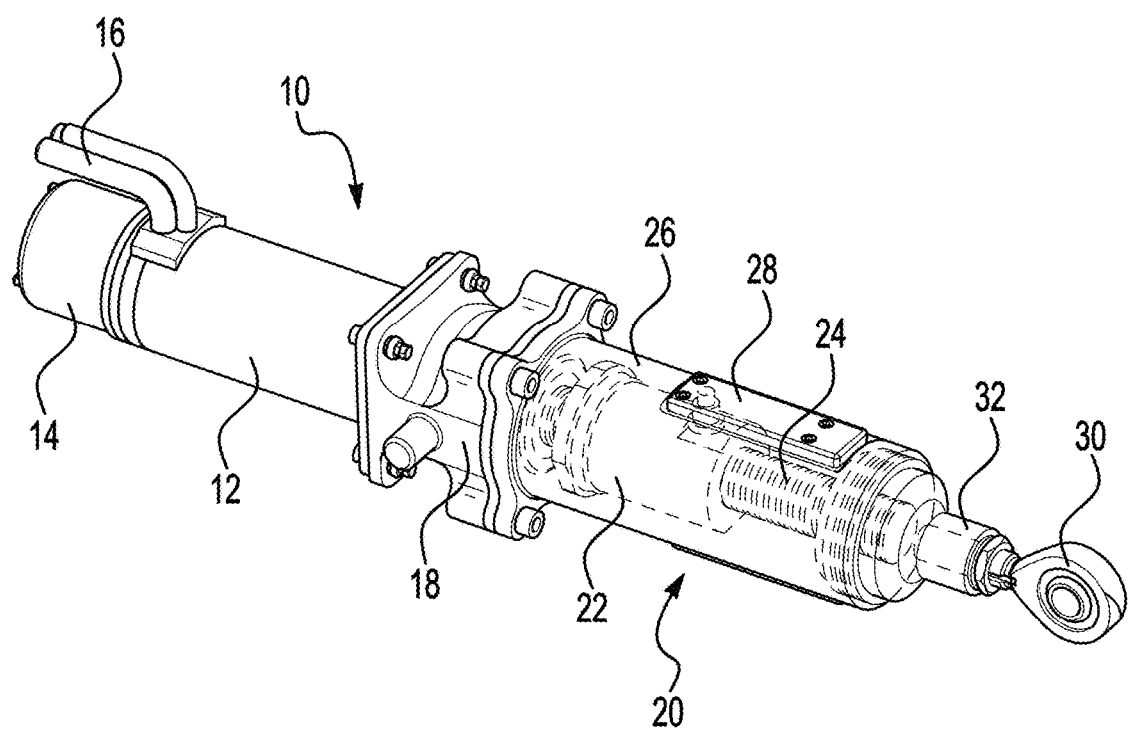
FIG. 2 is a drawing depicting the exemplary linear EMA of FIG. 1 with a cover tube "ghosted" to illustrate certain internal components.

FIG. 1 is a drawing depicting an isometric view of an exemplary linear electro-mechanical actuator (EMA) 10 for use in an actuator assembly in accordance with embodiments of the present application. FIG. 2 is a drawing depicting the exemplary linear EMA 10 with a tube cover "ghosted" to illustrate certain internal components. It will be appreciated that a linear EMA 10 can have a variety of suitable configurations for use in actuator assembly embodiments of the present application, and therefore the linear EMA 10 should be considered a non-limiting example and certain specific features may have variations that do not impact usage in the broader, overall actuator assembly described below. The linear EMA 10 includes an electric motor 12 that drives motion of an actuating element, as further detailed below. The linear EMA 10 further may include an electric brake 14 mechanically coupled to the electric motor 12 to provide more precise electrically controlled motion of the actuating element. Electric power may be supplied to the electric motor 12 and electric brake 14 via electrical leads housed within a lead connector 16.

The motor output of the electric motor 12 is mechanically coupled to a transmission assembly that operates to reduce the speed of the motor output, and to convert the rotational motor output into a linear motion for imparting linear motion to the actuating element. For example, a suitable transmission assembly may include a speed reduction assembly 18 and a power screw assembly 20. The speed reduction assembly 18 is mechanically coupled to the output of the electric motor and may have a gear train and trunnion configuration, through which the electric motor drives the power screw assembly 20. The power screw assembly in particular is illustrated in the "ghosted" portion of FIG. 2. The power screw assembly 20 is mechanically coupled between the speed reduction gear train and the actuating element, and converts the output of the electric motor into the linear motion of the actuating element. For example, the power screw assembly 20 may include a multi-circuit ball nut 22 with associated anti-rotation trunnions and rollers, which are mechanically coupled to a ball screw 24.

As illustrated in FIG. 1, the power screw assembly 20 may be housed within a tube cover 26 having one or more access covers 28. The access cover 28 is removable to permit access to the housing area for the ball nut assembly 22 and power screw assembly 20 through the tube cover 26 for assembly. Such power screw assemblies generally are well known in the art of actuators for driving flight control surfaces of an aircraft. The speed reduction assembly reduces the motor output speed to a suitable level, and the power screw assembly 20 converts the rotational motion of the motor output into a linear motion for driving linear motion of the actuating element. In the depicted example, the power screw assembly 20 is mechanically coupled to an output rod end 30 that operates as the referenced actuating element, whereby operation of the power screw assembly 20 drives motion of the output rod end 30 in a linear direction, such as extension or retraction of the rod end 30 relative to the power screw assembly 20. The output rod end 30 may extend through and move through an extension tube portion 32 of the tube cover 26. The rod end 30 further has a connection hole for implementing a pin connection to a bell crank as further detailed below.

Figure 3:
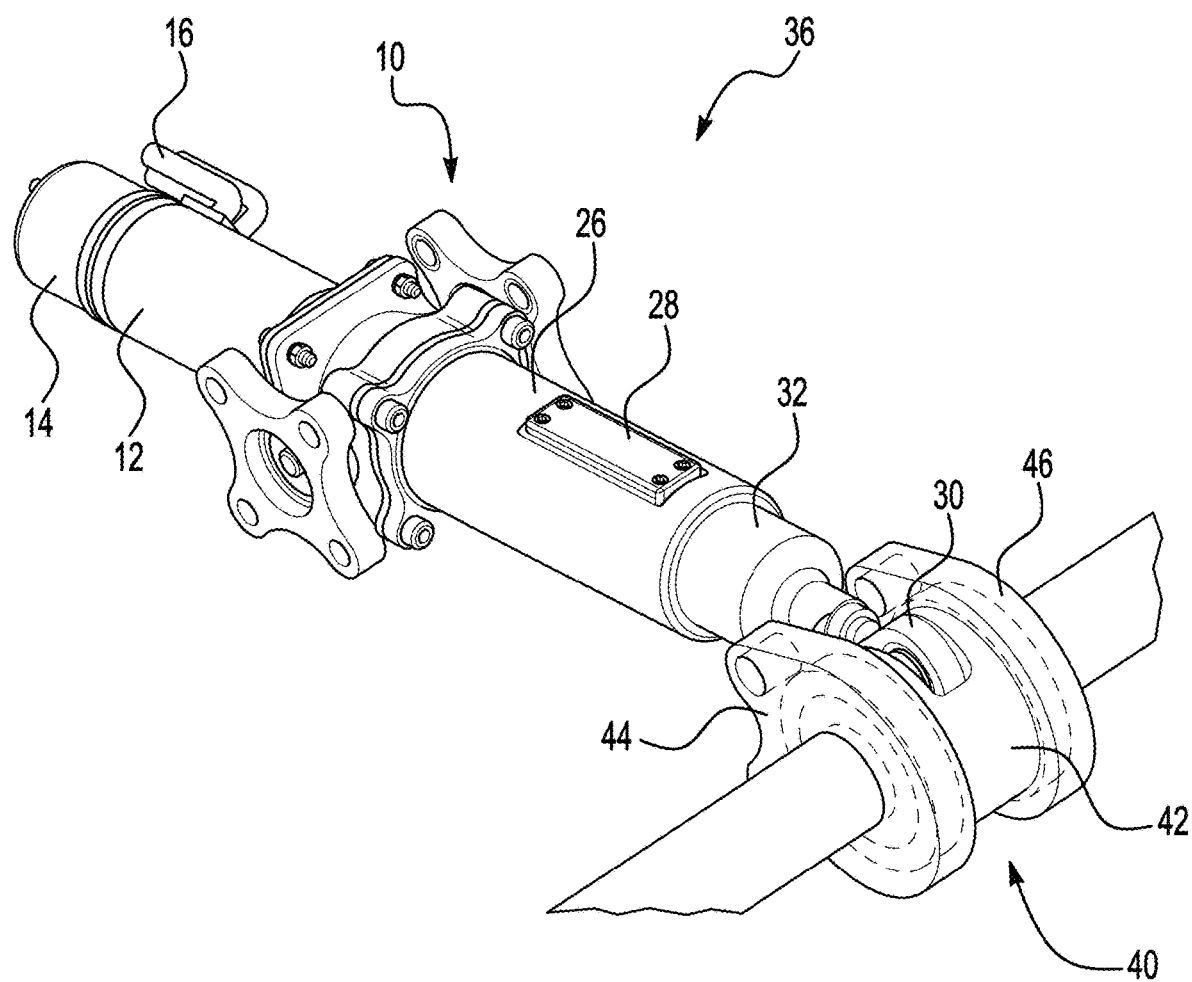
FIG. 3 is a drawing depicting an isometric view of an exemplary linear electro-mechanical actuator (EMA) assembly including the linear EMA of FIGS. 1 and 2 in combination with a bell crank assembly in accordance with embodiments of the present application.

FIG. 3 is a drawing depicting an isometric view of an exemplary linear electro-mechanical actuator (EMA) assembly 36 including the linear EMA 10 of FIGS. 1 and 2 in combination with a bell crank assembly 40 in accordance with embodiments of the present application. As further detailed below, the bell crank assembly 40 includes a bell crank that is rotatable around a central axis and that has a rod connection opening for receiving the rod end of the linear actuator. The bell crank further includes a tube opening along the central axis for receiving at least one torque tube. The bell crank assembly further includes a first bearing plate and a second bearing plate located on opposite sides of the bell crank, whereby the bank crank rotates relative to the first bearing plate and the second bearing plate. A connection pin provides a hinge connection of the rod end of the linear actuator to the bell crank such that the linear motion of the rod end imparts a rotational or articulating motion to the bell crank.

Referring initially to FIG. 3, the linear EMA 10 is mechanically coupled to the bell crank assembly 40 to convert the linear motion outputted by the linear EMA 10 into a rotational or articulating motion of a bell crank component of the bell crank assembly. As seen in FIG. 3, the bank crank assembly 40 includes a bank crank 42 that is rotationally positioned by one or more bearing plates, whereby the bell crank 42 rotates relative to the bearing plates. In the embodiment depicted in FIG. 3, the bell crank 42 is rotationally positioned by a first bearing plate 44 and a second bearing plate 46. The bearing plates 44 and 46 are located on opposite sides of the bell crank 42 whereby the bell crank 42 extends between the bearing plates 44 and 46. The rod end 30 of the linear EMA 10 is mechanically coupled eccentrically or off center relative to a central axis of the bell crank 42. In this manner, linear motion of the rod end 30, including linear extension or retraction of the rod end 30, imparts a rotating or articulating motion to the bell crank 42.

Figure 4:
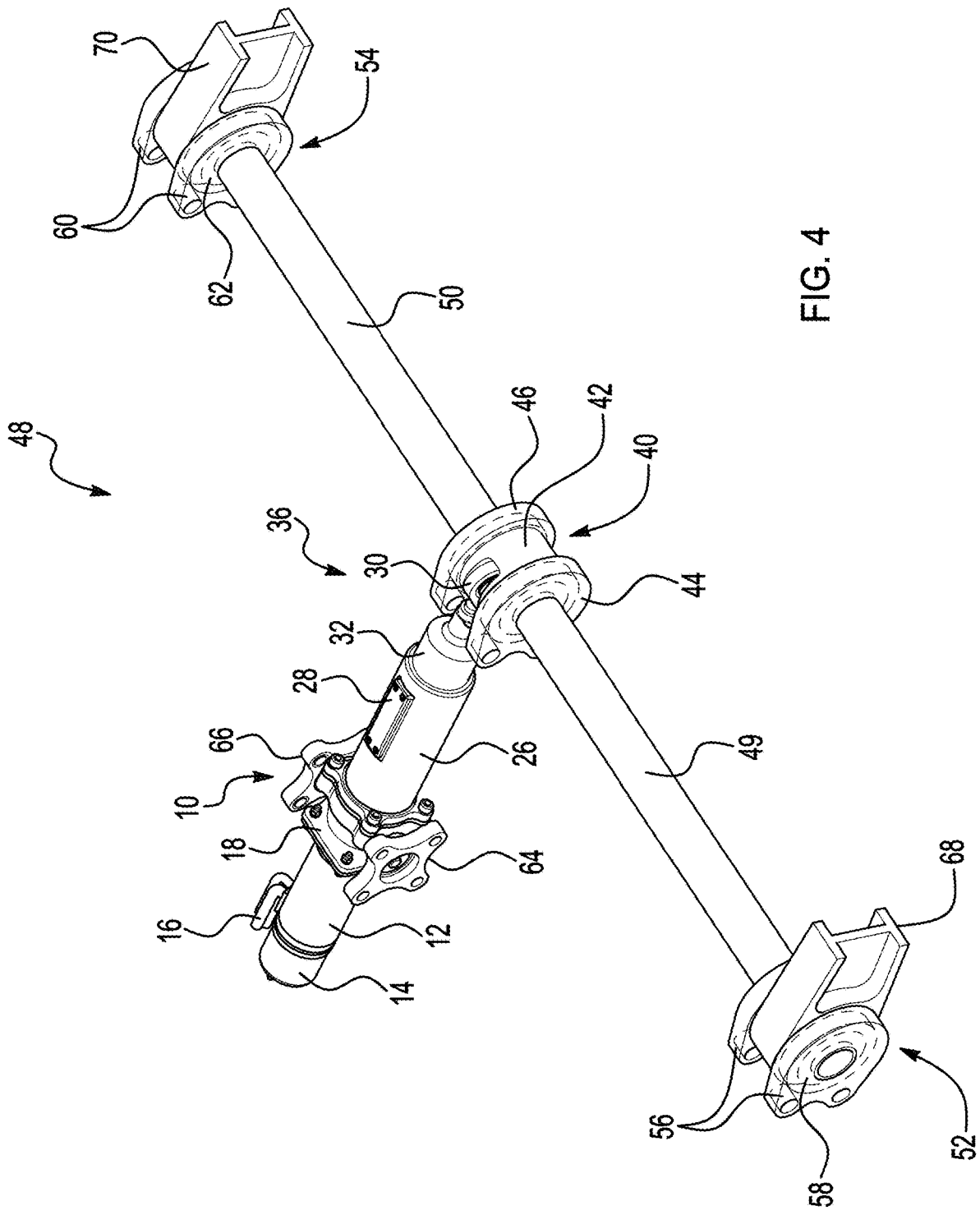
FIG. 4 is a drawing depicting an isometric view of the linear EMA assembly of FIG. 3 implemented as a hinge line drive forming a control surface.

FIG. 4 is a drawing depicting an isometric view of the linear EMA assembly 36 of FIG. 3 implemented as a hinge line drive 48. Generally, the hinge line drive 48 includes the linear EMA assembly 36 accordingly to any of the embodiments, at least one torque tube that is fixed to the bell crank, wherein rotation or articulation of the bell crank rotates the torque tube, and a control structure that is fixed to the torque tube at a location spaced apart from the bell crank, wherein rotation of the torque tube rotates or articulates the control structure. Referring to the example configuration depicted in FIG. 4, opposing first torque tube 49 and second torque tube 50 are fixed to and extend from opposing sides of the bell crank 42.

In exemplary embodiments, the hinge line drive 48 includes at least one fixed mounting that includes a pair of plates and a pair of bearings positioned within the pair of plates, and that supports rotation of the torque tube. The control structure is positioned between the pair of plates of the fixed mounting. In the example of FIG. 4, ends of the opposing first and second torque tubes 49 and 50 are rotationally positioned through respective first and second fixed mountings 52 and 54 located adjacent to respective ends of the first and second torque tubes. The first fixed mounting 52 includes a first pair of plates 56 and a first pair of bearings 58, and a second fixed mounting 54 includes a second pair of plates 60 and a second pair bearings 62. The first and second torque tubes respectively are rotatably supported by the bearings 58 and 62. In an exemplary usage for aircraft applications, the fixed mountings 52 and 54 may mount the actuator assembly 36 to an aircraft wing spar, and therefore the fixed mountings 52 and 54 also may be referred to as spar mountings. Such configuration is one example, and other suitable bearing arrangements may be employed. Other examples may include a single ball bearing at each end, or journal bearings. To support axial loads along the torque shafts, thrust bearings could also be included as part of the arrangement. Additional mountings 64 and 66, which also may be referred to as spar mountings in an aircraft application, further may be fixed mountings that connect the linear EMA 10 portion of the actuator assembly 36 to a mounting surface, which in an aircraft application also may a portion of a wing spar. Control structures are fixed to the torque tube ends between the plates of the fixed mountings 52 and 54. In this example, a first control structure 68 is fixed adjacent to the end of the first torque tube 49 between the plates 56 of the first fixed mounting 52, and a second control structure 70 is fixed adjacent to the end of the second torque tube 50 between the plates 60 of the second fixed mounting 54.

As referenced above, linear motion of the rod end 30, including linear extension or retraction of the rod end 30, imparts a rotating or articulating motion to the bell crank 42. This motion in turn results in rotation of the torque tubes 49 and 50, thereby in turn articulating or rotating the control structures 68 and 70. In use, the control structures 68 and 70 are connected to a control surface for angular positioning of the control surface. Accordingly, the control structures 68 and 70 may be configured as a hinge connection, anchor, lever, mounting plate, or any other suitable connecting element as are used in the art for mechanically coupling a control surface to an actuator. In an aircraft application, for example, the control structures 68 and 70 are connected to a control surface for aircraft control, such as for example a rudder control surface, elevon control surface, elevator control surface, flap control surface, aileron control surface, ground spoiler control surface, flight spoiler control surface, flaperon control surface, spoileron control surface, and door control surface. An angular position of any such control surface may be set using the actuator assembly of the present application. The configuration whereby linear motion of the rod end rotates or articulates the bell crank, and thereby the torque tubes and control structures, allows two or more of the linear EMA assemblies to be positioned on an aircraft control surface to act as a hinge line drive. Accordingly, the linear EMA assembly of the current application replaces the conventional actuator assembly configurations that use dog bone or comparable lever linkages with separate hinges. The linear EMA assembly of the current application thus is operated as one compact hinge and drive assembly.

As a result, the linear EMA assembly of the current application is capable of being sufficiently compact for incorporation or use in any application in which compactness of the actuator assembly is a significant consideration. For example, the linear EMA assembly of the current application is capable of being sufficiently compact for incorporation within the wing spar of a typical eVTOL or other electric or VTOL aircraft. The linear EMA assembly offers a high-speed control solution by employing a specially designed bell crank having a short horn arm, which allows for a substantially more compact configuration as compared to conventional linear EMA configurations. The linear EMA assembly further offers an efficiency characterized by high load/torque performance with low power consumption, which further renders the linear EMA assembly highly suitable for eVTOL aircraft in which power consumption is a substantial consideration. When compared to conventional configurations that employ a conventional rotary actuator, dog bone, or lever linkage concept, the linear EMA assembly of the current application consumes about half the power as compared to a conventional EMA for the same loaded rate.

Figure 5:
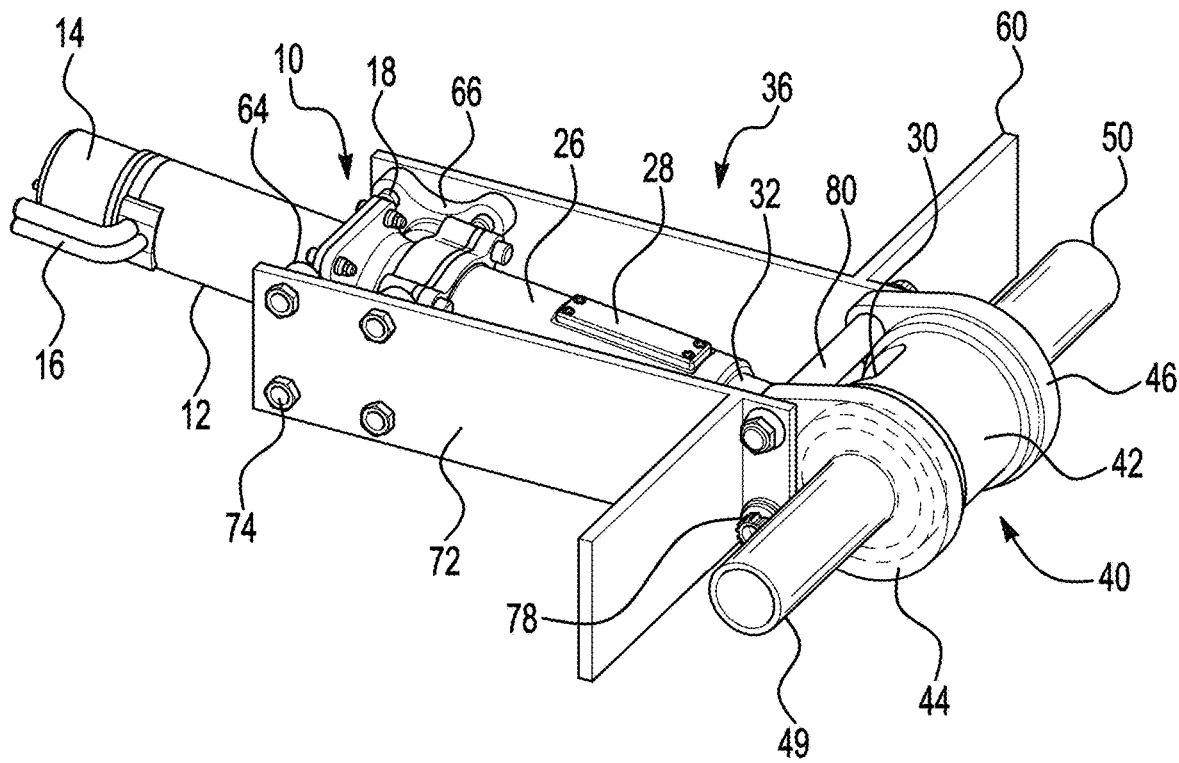
FIG. 5 is a drawing depicting an isometric view of an exemplary mounting of the linear EMA assembly of FIG. 3 in a support frame.
Figure 6:
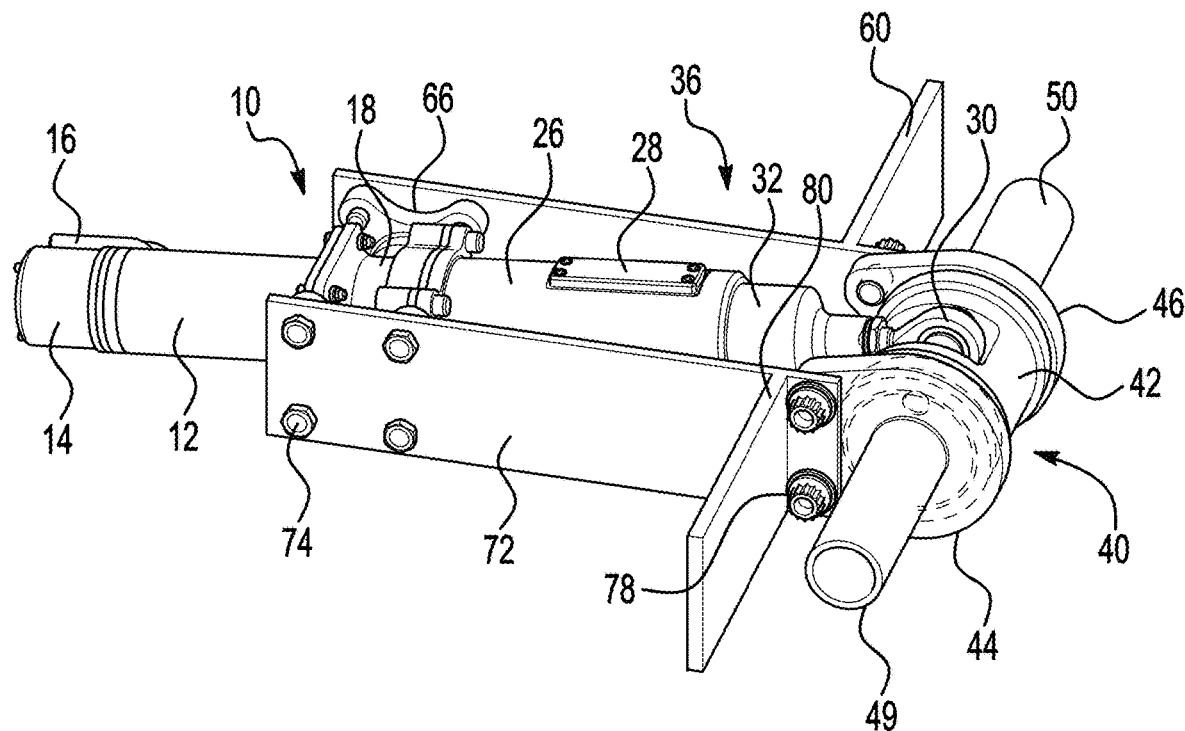
FIG. 6 is a drawing depicting an isometric view of the mounting of the linear EMA assembly of FIG. 3 in a support frame from a different viewpoint relative to FIG. 5.

FIG. 5 is a drawing depicting an isometric view of an exemplary mounting of the linear EMA assembly 36 of FIG. 3 in a support frame 72. As referenced previously, in an example of an aircraft application, the support frame 72 may be a portion of a wing spar, such as a wing spar structural rib, such that the linear EMA assembly 36 is positioned internally within the wing spar ribs. In this example, the spar mountings 64 and 66 connect the linear actuator 10 to the support frame 72 using any suitable mechanical fasteners 74, such as for example bolts, nuts and washers, screws, rivets, anchors, or the like. In addition, the first bearing plate 44 and the second bearing plate 46 of the bell crank assembly 40 also are connected to the support frame 72 using any comparable suitable mechanical fasteners 78. As seen in the depiction of FIG. 5, a spacer tube 80 extends between and through the bearing plates 44 and 46, and ends of the spacer tube 80 are fixed to the support frame 72 to connect the first and second bearing plates to the support frame. FIG. 6 is a drawing depicting an isometric view of the mounting of the linear EMA assembly of FIG. 3 in the support frame 72 from a different viewpoint relative to FIG. 5. In the depiction of FIG. 6, such viewpoint illustrates that the bearing plates 44 and 46 further are fastened directly to the support frame 72. Different options in the nut arrangement may be employed. FIG. 5 shows a nut on the end of the bolt going through the spacer tube 80. In FIG. 6, the upper bolts can optionally use the same nuts, or as shown, thread into locking inserts built into bearing plates 44 and 46. Access may be limited during aircraft assembly such that the locking inserts are preferred over trying to hold a nut in place while threading in a bolt.

Figure 7:
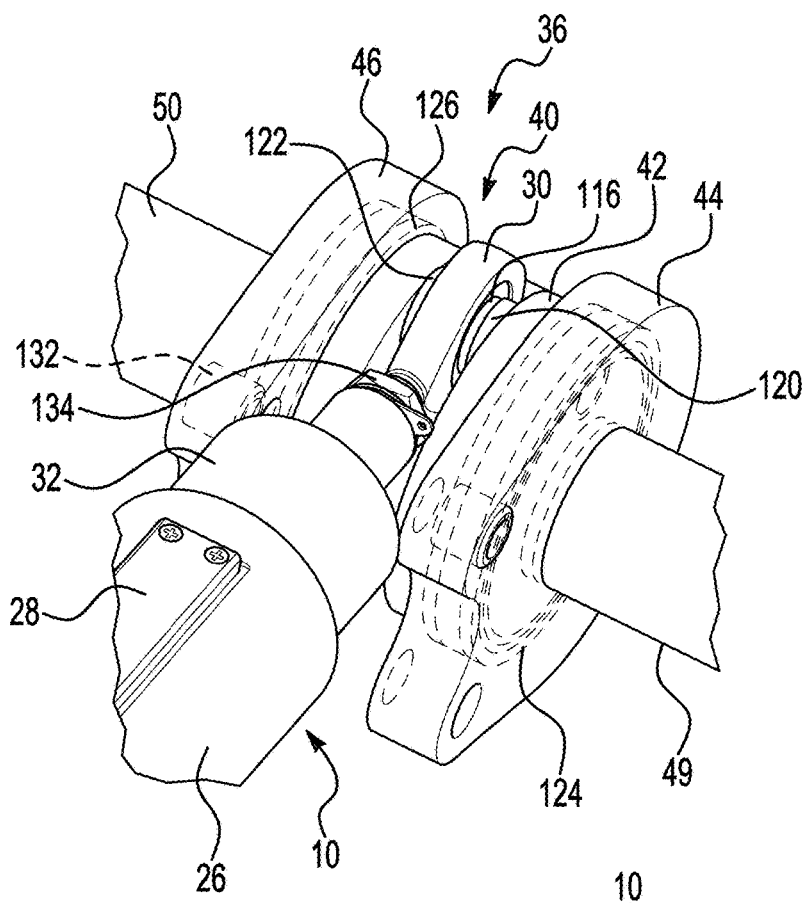
FIG. 7 is a drawing depicting a portion of the linear EMA assembly, and more specifically an isometric and close-up view of the bell crank assembly in the area of the connection to the rod end of the linear EMA from a first viewpoint.
Figure 8:
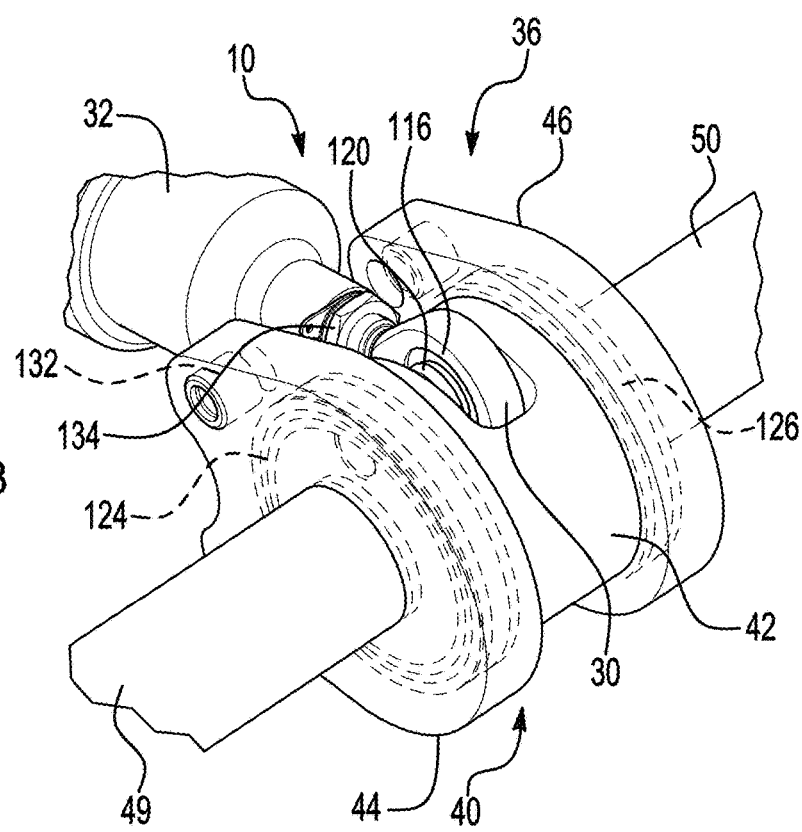
FIG. 8 is a drawing depicting the portion of the linear EMA assembly of FIG. 7, and more specifically an isometric and close-up view of the bell crank assembly in the area of the connection to the rod end of the linear EMA from a second viewpoint.
Figure 9:
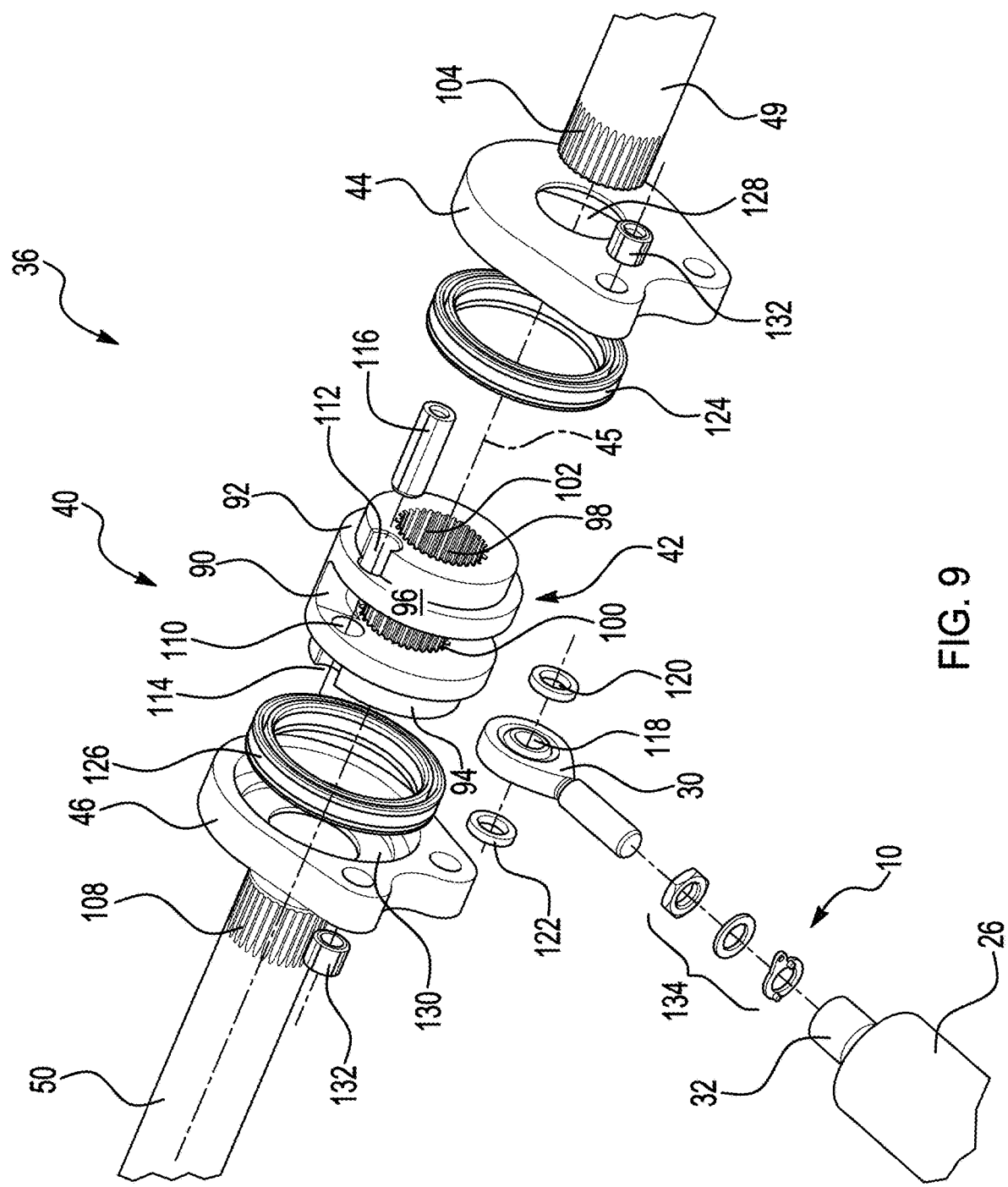
FIG. 9 is a drawing depicting the portion of the linear EMA assembly of FIG. 7, and more specifically an isometric and exploded view of the bell crank assembly in the area of the connection to the rod end of the linear EMA.

FIGS. 7-9 are drawings that provide a better illustration of details of the bell crank assembly 40 and associated connection to the rod end 30 of the linear EMA 10. In particular, FIGS. 7 and 8 are drawings each depicting an isometric and close-up view of a portion of the linear EMA assembly 36 showing the bell crank assembly in the area of the connection to the rod end 30 of the linear EMA 10, from different viewpoints. FIG. 9 is a drawing depicting an isometric and exploded view of the portion of the linear EMA assembly 36, also showing bell crank assembly 40 in the area of the connection to the rod end 30 of the linear EMA 10.

As described above, the bell crank assembly 40 includes the bell crank 42 that is rotationally supported by one or more bearing plates. In the depicted embodiment, the bell crank 42 is rotationally supported by the first bearing plate 44 and the second bearing plate 46. The bell crank 42 is rotatable around a central axis (see FIG. 9) relative to the bearing plates. As best seen in the exploded view of FIG. 9, the bell crank 42 includes a bell crank body 90 and first and second circular bearing supports 92 and 94 positioned on opposite sides of the bell crank body 90. In this manner, the first bearing support 92 and the second bearing support 94 are positionally separated along the central axis 45, with the bell crank body 90 defining a rod connection opening 96 between the bearing first and second supports 92 and 94. Each of the first and second bearing supports 92 and 94 includes a respective tube opening 98 and 100 oriented along the central axis for receiving ends of respective first torque tube 49 and second torque tube 50. The torque tube ends may be fixed into the tube openings 98 and 100 via a spline interface including first splines 102 in the tube openings 98/100, and second an opposing splines 106/108 on an outer surface of ends of the torque tubes 49 and 50.

As also best seen in the exploded view of FIG. 9, the bell crank body 90 includes pin openings 110, and the first bearing supports 92 and the second bearing support 94 include respective first pin slot 112 and second pin slot 114 that are spatially contiguous with the pin openings 110. The pin openings 110 and pin slots 112/114 are sized to receive a connection pin 116 for pivotally connecting the actuator rod end 30 to the bell crank 42 within the rod connection opening 96. For such connection, the rod end 30 includes a connection hole 118 through which the connection pin 116 extends when the actuator assembly is in an assembled state. The bell crank assembly 40 further includes a first washer 120 and a second washer 122 that are positioned on opposite sides of the rod end 30, and that act as contact surfaces between the rod end 30 and the bell crank body 90. The first and second pin slots 112 and 114 (ending in the pin openings 110) and the rod connection opening 96 extend substantially perpendicularly to each other, such that in an assembled state, the connection pin 116 extends through the pin openings 110 and pin slots 112/114, and also extends through the connection hole 118 of the rod end to provide the hinged connection of the rod end to the bell crank. Furthermore, the pin openings 110 and pin slots 112/114 are positioned spaced apart from or eccentrically relative to the central axis 45 of the bell crank 42. In this manner, as described above, linear motion of the rod end 30, including linear extension or retraction of the rod end 30, imparts a rotating or articulating motion to the bell crank 42.

The bell crank assembly 40 supports thrust loads through two large diameter circular contact bearings. In particular, the bell crank assembly 40 includes a first circular contact bearing 124 and a second circular contact bearing 126. The first bearing plate 44 includes a first internal bearing cavity 128 that receives the first circular contact bearing 124, and the second bearing plate 46 includes a second internal bearing cavity 130 that receives the second circular contact bearing 126. In addition, the first circular contact bearing 124 receives the first bearing support 92 and the second circular contact bearing 126 receives the second bearing support 94. Accordingly, once in the assembled state, the first contact bearing is positioned within the first internal bearing cavity and the second contact bearing is positioned within the second internal bearing cavity, and the first bearing support is positioned within the first contact bearing and the second bearing support is positioned within the second contact bearing to support the rotating or articulating motion of the bell crank, as further detailed below. Accordingly, the circular contact bearings are located on opposite sides of the bell crank in supportive, rotational contact with a respective bearing support of the bell crank.

The bank crank assembly further may include one or more locking inserts 132 that are received within the bearing plates 44 and 46. The locking inserts 132 receive the fastening elements that fasten the bearing plates to the support frame (see FIG. 3 above) to provide a more robust mounting connection. In addition, a jam nut and locking device 134 may be used to secure the rod end 30 to the extension tube portion 32 of the tube cover 26 of the actuator assembly.

Figure 10:
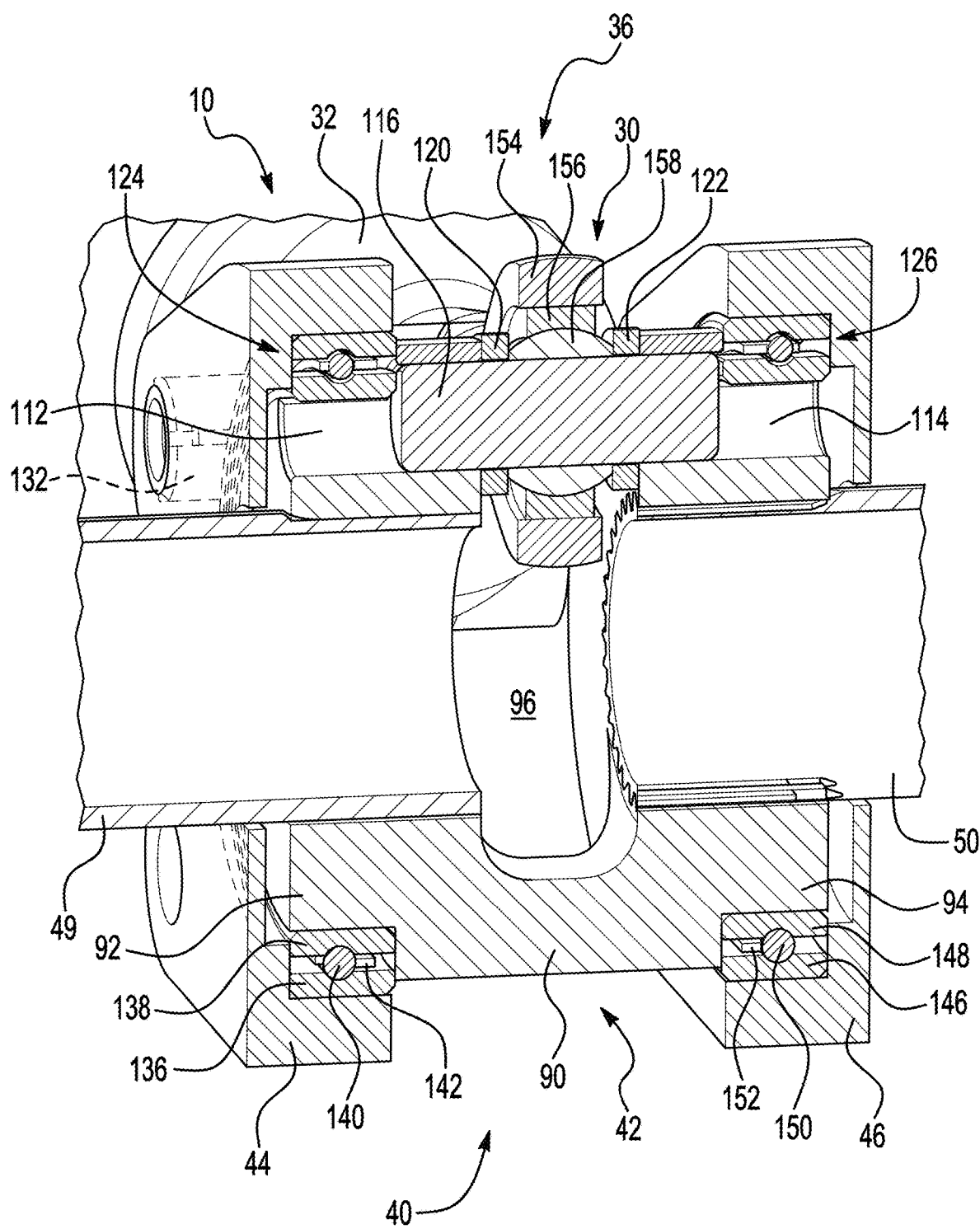
FIG. 10 is a drawing depicting the portion of the linear EMA assembly of FIG. 7, and more specifically an isometric and cross-sectional view of the bell crank assembly in the area of the connection to the rod end of the linear EMA from a first viewpoint.
Figure 11:
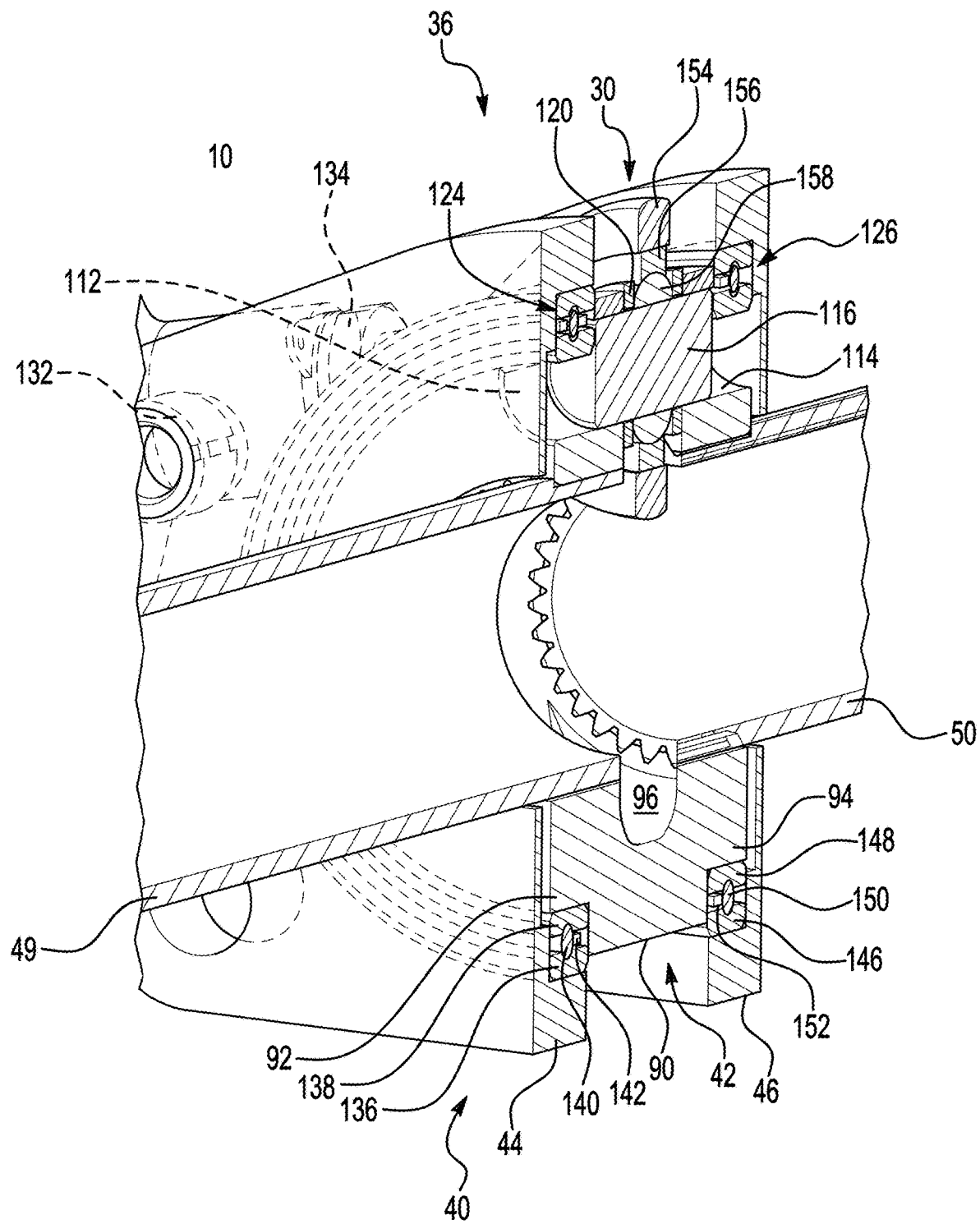
FIG. 11 is a drawing depicting the portion of the linear EMA assembly of FIG. 7, and more specifically an isometric and cross-sectional view of the bell crank assembly in the area of the connection to the rod end of the linear EMA from a second viewpoint

FIGS. 10 and 11 each is a drawing depicting an isometric and cross-sectional closeup view of the portion of the linear EMA assembly 36 showing the bell crank assembly 40 in the area of the connection to the rod end 30 from different viewpoints. FIGS. 10 and 11 in particular provide a better illustration of certain details related to the operation of the first and second circular contact bearings 124 and 126. In the depicted example, each of the first and second circular contact bearings operates as a track type bearing, with an inner race rotating relative to an outer race about a series of bearing balls rotating within a track formed by the inner and outer races. In particular, the first circular contact bearing 124 includes a first outer race 136, a first inner race 138, and a first plurality of bearing balls 140 that are maintained in place by a first ball cage 142. The first outer race 136 is fixed in a stationary manner within the first bearing plate 44, and the first inner race 138 is fixed to the first bearing support 92 of the bell crank 42. The first inner and outer races form a ball track that receives the first plurality of bearing balls 140. Similarly, the second circular contact bearing 126 includes a second outer race 146, a second inner race 148, and a second plurality of bearing balls 150 that are maintained in place by a second ball cage 152. The second outer race 146 is fixed in a stationary manner within the second bearing plate 46, and the second inner race 148 is fixed to the second bearing support 94 of the bell crank 42. The second inner and outer races form a ball track that receives the second plurality of bearing balls 150. In operation, for converting the linear motion rod end 30 into rotational motion of the bell brank 42, the inner races, and thereby the bell crank, rotate relative to the outer races about the bearing balls.

The rod end 30 may have a layered structure for enhanced robustness and performance in interaction with the connection pin 116. As shown particularly in the cross-section views of FIGS. 10 and 11, the rod end 30 may include an outer rod frame 154, a support ring 156 positioned internally relative to the outer rod frame 154, and an internal contact ring 158 that defines the connection hole 118 (see FIG. 9) and provides the contact surface for the connection pin 116.

In accordance with the above, the rod end of the linear actuator interacts to impart articulating or rotating motion to the bell crank directly on the hinge line for the control surface. No additional linkage between the actuator assembly and the hinge line, such as a dog bone or other lever linkage, is required. Accordingly, the linear EMA assembly of the current application replaces the conventional actuator assembly that uses dog bone or comparable lever linkages that drive control surfaces using separate hinges, with the linear EMA assembly of the current application being operated using one compact hinge and drive assembly. As a result, the linear EMA assembly of the current application may be sufficiently compact for incorporation within the wing spar of a typical eVTOL or other electric or VTOL aircraft. The linear EMA assembly offers a high-speed control solution with the bell crank having a short horn arm, which allows for a substantially more compact configuration as compared to conventional linear EMA configurations. The linear EMA assembly further has high load/torque performance with low power consumption, high reliability, and compact envelop, which further renders the linear EMA assembly highly suitable for eVTOL aircraft in which power consumption is a substantial consideration. When compared to conventional configurations that employ a rotary actuator or linkage concept, the linear EMA assembly of the present application consumes about half the power as compared to a conventional EMA for the same loaded rate. As referenced above, although embodiments of the present application are described principally in connection with aircraft applications and electric aircraft applications in particular, it will be appreciated that comparable principles may be applied for use in any application in which a compact linear EMA assembly is suitable for articulation or rotation of a control surface.

In addition, although the bank crank assembly has been described principally in connection with use in combination with a linear electro-mechanical actuator (EMA), such use in combination with a linear EMA is non-limiting. Accordingly, the bell crank assembly according to any of the embodiments may be used in combination with any suitable linear actuator that has an output rod end that is subject to linear extension and retraction as the output of the linear actuator, whereby the bell crank assembly converts the linear output of the linear actuator into a rotational or articulating motion. For example, in certain aircraft or other applications, hydraulic linear actuators may be employed, and the various embodiments of the bell crank assembly are suitable for use with hydraulic actuators. Other suitable linear actuators may be employed with the described bell crank assembly by configuring the output rod end of the linear actuator as described above to be suitable for interaction with the bell crank assembly.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A linear electro-mechanical actuator (EMA) assembly comprising:
   a linear actuator comprising an electric motor, a transmission assembly, and an actuating element having a rod end, wherein the transmission assembly converts an output of the electric motor into a linear motion of the actuating element; and
   a bell crank assembly comprising:
      a bell crank that is rotatable around a central axis and that has a rod connection opening for receiving the rod end, the bell crank further including a tube opening along the central axis for receiving a torque tube;
      a first bearing plate and a second bearing plate positioned on opposite sides of the bell crank, whereby the bell crank rotates relative to first bearing plate and the second bearing plate; and
      a connection pin to provide a hinge connection of the rod end to the bell crank such that the linear motion of the rod end imparts a rotational or articulating motion to the bell crank.

2. The linear EMA assembly of claim 1, wherein the first bearing plate has a first internal bearing cavity and the second bearing plate has a second internal bearing cavity, and
   the bell crank assembly further comprises a first contact bearing that is positioned within the first internal bearing cavity and a second contact bearing that is positioned within the second internal bearing cavity, and the first contact bearing and the second contact bearing rotationally support the rotating or articulating motion of the bell crank.

3. The linear EMA assembly of claim 2, wherein the first contact bearing and the second contact bearing are circular contact bearings, and the first bearing support and the second bearing support are circular bearing supports.

4. The linear EMA assembly of claim 2, wherein the bell crank comprises a bell crank body that defines the rod connection opening, and a first bearing support and a second bearing support positioned on opposite sides of the bell crank body;
   wherein the first bearing support is positioned within the first contact bearing and the second bearing support is positioned within the second contact bearing to support the rotating or articulating motion of the bell crank.

5. The linear EMA assembly of claim 4, wherein the first bearing support and the second bearing support are positionally separated along the central axis, with the bell crank body defining the rod connection opening between the first bearing support and the second bearing support.

6. The linear EMA assembly of claim 4, wherein each of the first bearing support and the second bearing support includes a respective tube opening oriented along the central axis for receiving ends of respective first and second torque tubes.

7. The linear EMA assembly of claim 4, wherein the bell crank body includes a pin opening, and the first bearing support include a first pin slot and the second bearing support includes a second pin slot that are spatially contiguous with the pin opening;

wherein the rod end includes a connection hole; and
wherein the connection pin extends through the pin opening, the connection pin slots, and the connection hole of the rod end to provide the hinge connection of the rod end to the bell crank.

8. The linear EMA assembly of claim 7, wherein the pin opening and the first and second pin slots are positioned in the bell crank spaced apart from the central axis of the bell crank.

9. The linear EMA assembly of claim 1, wherein the bell crank assembly further includes a first washer and a second washer that are positioned on opposite sides of the rod end, and the first washer and the second washer act as contact surfaces between the rod end and the bell crank.

10. The linear EMA assembly of claim 1, wherein the linear actuator further includes an electric brake; and
wherein the transmission assembly includes a speed reduction gear train mechanically coupled to the output of the electric motor, and a power screw assembly mechanically coupled between the speed reduction gear train and the actuating element and that converts the output of the electric motor into the linear motion of the actuating element.

11. A hinge line drive comprising:
the linear EMA assembly accordingly to claim 1,
at least one torque tube that is fixed to the bell crank at the tube opening, wherein the rotating or articulating motion of the bell crank rotates the torque tube; and
a control structure that is fixed to the torque tube at a location spaced apart from the bell crank, wherein rotation of the torque tube rotates or articulates the control structure.

12. The hinge line drive of claim 11, further comprising at least one fixed mounting located adjacent to an end of the at least one torque tube opposite from the bell crank, wherein the at least one torque tube rotates relative to the fixed mounting.

13. The hinge line drive of claim 12, wherein the at least one fixed mounting includes a pair of plates and a pair of bearings positioned within the pair of plates and that support rotation of the torque tube, and the control structure is positioned between the pair of plates of the fixed mounting.

14. The hinge line drive of claim 13, wherein the at least one torque tube includes a first torque tube and a second torque tube that are fixed to and extend from opposite sides of the bell crank, and the at least one fixed mounting includes a first fixed mounting and a second fixed mounting located at respective ends of the first and second torque tubes.

15. The hinge line drive of any of claim 11, further comprising a support frame, wherein the first bearing plate and the second bearing plate of the bell crank assembly are connected to the support frame.

16. The hinge line drive of claim 15, further comprising:
a spacer tube that extends between the first bearing plate and the second bearing plate to connect the first bearing plate and the second bearing plate to the support frame; and
an additional mounting for connecting the linear actuator to the support frame.

17. An actuator assembly comprising:
a linear actuator comprising an output rod end that is subject to linear extension and retraction as output of the linear actuator; and
a bell crank assembly comprising:
a bell crank that is rotatable around a central axis and that has a rod connection opening for receiving the rod end, the bell crank further including a tube opening along the central axis for receiving a torque tube;
a first bearing plate and a second bearing plate positioned on opposite sides of the bell crank, whereby the bell crank rotates relative to first bearing plate and the second bearing plate; and
a connection pin to provide a hinge connection of the rod end to the bell crank such that the linear motion of the rod end imparts a rotational or articulating motion to the bell crank;
wherein the first bearing plate has a first internal bearing cavity and the second bearing plate has a second internal bearing cavity, and
wherein the bell crank assembly further comprises a first contact bearing that is positioned within the first internal bearing cavity and a second contact bearing that is positioned within the second internal bearing cavity, and the first contact bearing and the second contact bearing rotationally support the rotating or articulating motion of the bell crank.

18. A bell crank assembly for use in converting a linear output of a linear actuator into a rotational or articulating motion, the bell crank assembly comprising:
a bell crank that is rotatable around a central axis and that has a rod connection opening for receiving an output rod end of the linear actuator, the bell crank further including a tube opening along the central axis for receiving a torque tube;
a first bearing plate and a second bearing plate positioned on opposite sides of the bell crank, whereby the bell crank rotates relative to first bearing plate and the second bearing plate; and
a connection pin to provide a hinge connection of the output rod end to the bell crank such that the linear motion of the output rod end imparts a rotational or articulating motion to the bell crank.

19. The bell crank assembly of claim 18, wherein the first bearing plate has a first internal bearing cavity and the second bearing plate has a second internal bearing cavity, and
the bell crank assembly further comprises a first contact bearing that is positioned within the first internal bearing cavity and a second contact bearing that is positioned within the second internal bearing cavity, and the first contact bearing and the second contact bearing rotationally support the rotating or articulating motion of the bell crank.

20. The bell crank assembly of claim 19, wherein the bell crank comprises a bell crank body that defines the rod connection opening, and a first bearing support and a second bearing support positioned on opposite sides of the bell crank body;
wherein the first bearing support is positioned within the first contact bearing and the second bearing support is positioned within the second contact bearing to support the rotating or articulating motion of the bell crank.

* * * * *